(12) United States Patent
O'Halloran et al.

(10) Patent No.: US 7,548,878 B2
(45) Date of Patent: Jun. 16, 2009

(54) SOFTWARE AND HARDWARE COMPONENT AUDIT AND INVENTORY MANAGEMENT SYSTEM

(75) Inventors: Steve O'Halloran, Greely (CA); Ross Norrie, Manotick (CA)

(73) Assignee: AssetMetrix, Inc., Ottawa, Onatrio (CA)

( * ) Notice: Subject to any disclaimer, the term of this patent is extended or adjusted under 35 U.S.C. 154(b) by 671 days.

(21) Appl. No.: 09/886,687

(22) Filed: Jun. 21, 2001

(65) Prior Publication Data

US 2001/0056386 A1 Dec. 27, 2001

(30) Foreign Application Priority Data

Jun. 23, 2000 (CA) .................................. 2312193
Apr. 17, 2001 (CA) .................................. 2344008

(51) Int. Cl.
*G06Q 10/00* (2006.01)
(52) U.S. Cl. ......................................... 705/28; 705/22
(58) Field of Classification Search .................... 705/28
See application file for complete search history.

(56) References Cited

U.S. PATENT DOCUMENTS

| 4,456,790 | A | 6/1984 | Soyack |
| 4,887,206 | A | 12/1989 | Natarajan |
| 5,285,494 | A | 2/1994 | Sprecher et al. |
| 5,717,595 | A | 2/1998 | Cherrington et al. |
| 5,761,432 | A | 6/1998 | Bergholm et al. |
| 5,832,511 | A | 11/1998 | Beck et al. |
| 5,870,558 | A | 2/1999 | Branton, Jr. et al. |
| 5,951,642 | A | 9/1999 | Onoe et al. |
| 5,958,012 | A | 9/1999 | Battat et al. |
| 6,021,492 | A | 2/2000 | May |
| 6,073,214 | A | 6/2000 | Fawcett |
| 6,346,885 | B1 * | 2/2002 | Curkendall ............... 340/572.4 |
| 6,530,018 | B2 * | 3/2003 | Fleming, III ................... 713/1 |

(Continued)

FOREIGN PATENT DOCUMENTS

CA 2231978 5/1998

OTHER PUBLICATIONS

Johnson, M. "Managing information resources at the US federal government". Journal of Systems Management, vol. 43 No. 4, Apr. 1992.*

(Continued)

*Primary Examiner*—F. Zeender
*Assistant Examiner*—Christopher Buchanan
(74) *Attorney, Agent, or Firm*—Senniger Powers LLP (57) ABSTRACT

A system for computer device component audit and inventory management operates in a data network and includes an inventory agent installed on a target computer device for detecting and compiling software and hardware inventory data associated with the target device. An inventory-commence message is deployed through an electronic message handling system, operable on the data network, which requests inventory data from the inventory agent which then compiles the inventory data into executable language statements for incorporation into a host database accessible by a client. Multiple reports may be generated regarding the inventory data. Fees may not be charged for aggregate inventory data. The system provides a client with the ability to remotely request, compile, analyze and report inventory data from target devices that do not necessarily have access to the data network at the time of the inventory request.

7 Claims, 8 Drawing Sheets

U.S. PATENT DOCUMENTS

| | | | |
|---|---|---|---|
| 6,664,897 B2 * | 12/2003 | Pape et al. | 340/573.3 |
| 6,694,359 B1 * | 2/2004 | Morris et al. | 709/219 |
| 6,694,366 B1 * | 2/2004 | Gernert et al. | 709/227 |
| 6,735,498 B2 * | 5/2004 | Hertz | 700/236 |
| 6,779,024 B2 * | 8/2004 | DeLaHuerga | 709/217 |
| 6,844,813 B2 * | 1/2005 | Hardman | 340/539.1 |

OTHER PUBLICATIONS

Marks, K. "Tools for the network handyman", Network World, vol. 12 No. 21, May 22, 1995.*

* cited by examiner

SOFTWARE AND HARDWARE COMPONENT AUDIT AND INVENTORY MANAGEMENT SYSTEM

FIELD OF THE INVENTION

This invention relates to component audit and inventory management systems, and more specifically to methods, systems, and products that provide the ability to obtain inventory data regarding hardware and software from computer devices.

BACKGROUND OF THE INVENTION

It is known in the art to manually scan computer inventory data where inventory takers walk from computer target device (TD) to TD and store the inventory data within a hand-held, or self-contained, device. The inventory data is then downloaded from this device to a central computer processor where the data information is re-interpreted and compiled. The limitations and drawbacks of such prior art include the excessive time and cost for a person to manually visit each TD and manually input the inventory information into the hand-held, or self-contained, storage unit. In some versions of this system, bar code readers verify the identity of the selected hardware bearing the bar code identifier. In other systems an individual manually installs a software inventory data reader. This entails considerable time, and expense, and necessitates a manual inventory identification system that is prone to failure and/or error. Furthermore, it precludes the ability to obtain an instant analysis of the TD inventory at any given time.

Other systems in the prior art include inventory data detection and compilation systems requiring the TDs to be continually accessible, or accessible at the moment of the inventory request, to a data network such as the Internet or a Local Area Network in order to obtain inventory information from the TD. Such systems typically require the user of a given TD to manually input the inventory information associated with that TD in order for inventory information to be compiled and reported. The limitations and drawbacks of such prior art include the fact that the TD must be continually accessible, or accessible at the time of the electronic inventory request, to the data network in order for the inventory management system to receive inventory data from that TD. In situations where TDs are intermittently accessible to the data network, results obtained from this system are not reliable. Furthermore, the data collected is predicated on the user being willing and able to supply accurate information respecting the particular TD. In situations involving large numbers of users and TDs, the data collected from such an inventory management system is unreliable. Furthermore, it requires the user of the TD to spend time to manually reply to the request for inventory information and then submit the inventory information to the requester. This precludes the ability to obtain an instantaneous, or near instantaneous, assessment of the inventory information from a large system with multiple users and TDs.

Furthermore, such systems generally utilize a desktop management interface (DMI) located within each TD or TD server. DMI is a known data interface that handles communication between software management applications and the manageable elements on or attached to a TD or TD server. Within the DMI, the standard way of describing elements is provided by the management information format (MIF).

The DMI includes a service layer program running on the TD that collects information from elements, manages that information in the MIF database, and passes the information to management applications as requested. The server layer controls communication between itself and management applications by means of a management interface (MI) and between itself and manageable elements by means of a component interface (CI). For example, a service layer interface for Microsoft Windows (_, Microsoft Corporation) operating system is available from Intel Corporation, Santa Clara, Calif. 95050.

Within the DMI, management applications are programs used for controlling or tracking the elements of a system. For instance manageable elements include hard disks, CD-ROMs, printers, motherboards, operating systems, graphics cards, sound cards, or modems. Each element provides information to the MIF database by means of an MIF file that contains the pertinent management information for that element. The information in the MIF file is compiled into the MIF database when the element is installed.

MIS managers can query individual machines to access DMIs and MIF databases on individual machines in order to obtain current information stored therein.

While an MIS has been used effectively to manage TDs and servers interconnected by a local area network (LAN), there has been no similar effective strategy to manage devices that are only intermittently accessible to a LAN or other data network. For example, there is no effective strategy to manage portable computers that are seldom or never permanently accessible to a LAN. Yet with the proliferation of the usage of portable computers and hand-held wireless devices, it is desirable to obtain inventory data concerning such devices. A further aspect of the limitations associated with such known systems is that inventory queries will not return inventory data where TDs are not accessible to the data network at the time of the inventory request.

Additional limitations include the fact that such systems involve the installation of a database on the TD. If the database is erased, the information respecting the TD is lost. Furthermore, if installed, the DMI is always operating as a persistent running component. It is not activated by a remote device or user. Accordingly, the DMI is easily detectable by a TD user.

It is desirable to have the ability to determine inventory data information regarding remote devices that do not necessarily continually subscribe to a persistent data network. It is further desirable to obtain this information quickly, and without the necessity of intervention by the TD user. It is further desirable to forward inventory data regarding TDs to a third party where such inventory data may be compiled into a database structure, analysed, and reported.

SUMMARY OF THE INVENTION

The object of the present invention is to provide an improved system, method, and product for computer component audit and inventory management. In accordance with an aspect of the present invention there is provided an inventory agent for installation on a target device accessible to a data network. The inventory agent comprises means for receiving an inventory-commence message from a client computer. Means are also provided for detecting and compiling inventory data associated with the target device as well as means for forwarding the inventory data to a host unit.

In another embodiment, inventory-commence messages and inventory data messages are transmitted within a message handling system which includes electronic mail for operation within the data network.

In another embodiment, none of the inventory-commence message, detection and compilation of TD inventory data and transmission of same to a host unit is detectible by a user of the TD so that inventory data may be compiled and reported without user intervention.

In still another embodiment, the target device need not be accessible or subscribing to the data network at the time the inventory-commence message is transmitted. The inventory agent is capable of detecting such a message at the next instance of connection or subscription to the data network and commencing the inventory at that time.

Furthermore, the target device may, in another embodiment, write the inventory data compiled regarding the associated target device into executable language statements, which may include Structure Query Language (SQL) for incorporation directly into a database associated with a host.

In another embodiment, there is provided a host unit for use in a computer programmed for use in a component audit and inventory management system. The computer operates on a data network and comprises a computer processor, a memory and a user interface. The host unit comprises means for forwarding via the data network an inventory-commence message to a client computer the inventory-commence message containing means for detecting characteristics of, and activating, an inventory agent installed on a target device. Means are also provided for receiving via the data network an inventory-data message from the inventory agent the inventory-data message including inventory data associated with the target device and for incorporating the inventory data into a database.

A sequential pulse number may be employed in an embodiment of the present invention where the inventory-commence message provides a means of ensuring accuracy in the reporting of inventory information.

In still another embodiment, the inventory agent provides to the host first and second inventory data. The first inventory data pertains to generalized information regarding the inventory assets and is not specific to a TD. The second inventory data pertains to TD-specific inventory data. The first inventory may be free of charge to a client while the second inventory data may incur a fee chargeable to a client accessing such information via the host unit.

In another embodiment, there is provided a computer program product comprising a memory having computer-readable code embodied therein for detecting and compiling inventory data associated with a target device comprising code means for receiving an inventory-commence message from a client computer code means for detecting and compiling inventory data associated with the target device; and code means for forwarding the inventory data to a host unit.

In another embodiment, there is provided a system for remote component audit and inventory management for operation in a data network comprising a host unit for use in a computer comprising a processor, memory, and user interface; a client computer for requesting inventory information; a target device characterized as a source of inventory data; and an inventory agent for installation on the target device and for receiving an inventory-commence message via the data network from the client computer and for detecting and compiling inventory data associated with the target device and for forwarding the inventory data in an inventory-data message via the data network to the host unit.

In still another embodiment, a method is provided for component audit and inventory management for operation in a data network comprising the steps of installing in a target device an inventory agent for receiving via the data network an inventory-commence message from a client computer and for detecting and compiling inventory data associated with the target device and for forwarding via the data network an inventory-data message including the inventory data to a host unit for incorporation into a host database; generating, by the client computer, a request for inventory data pertaining to a target device for reception by the host unit via the data network; generating, by the host unit, an inventory-commence message capable of detecting characteristics of the inventory agent installed within the target device and sending the inventory-commence message to the client computer via the data network; forwarding, by the client computer, the inventory-commence message via the data network to the target device for triggering the installed inventory agent; detecting, by the inventory agent, inventory data associated with the target device; and delivering, by the inventory agent, via the data network the inventory data to the host unit.

BRIEF DESCRIPTION OF THE DRAWINGS

The invention will further be described with reference to the attached drawings showing an embodiment thereof.

Similar references are used in different figures to denote similar components.

DETAILED DESCRIPTION OF THE PREFERRED EMBODIMENTS

Figure 1A:
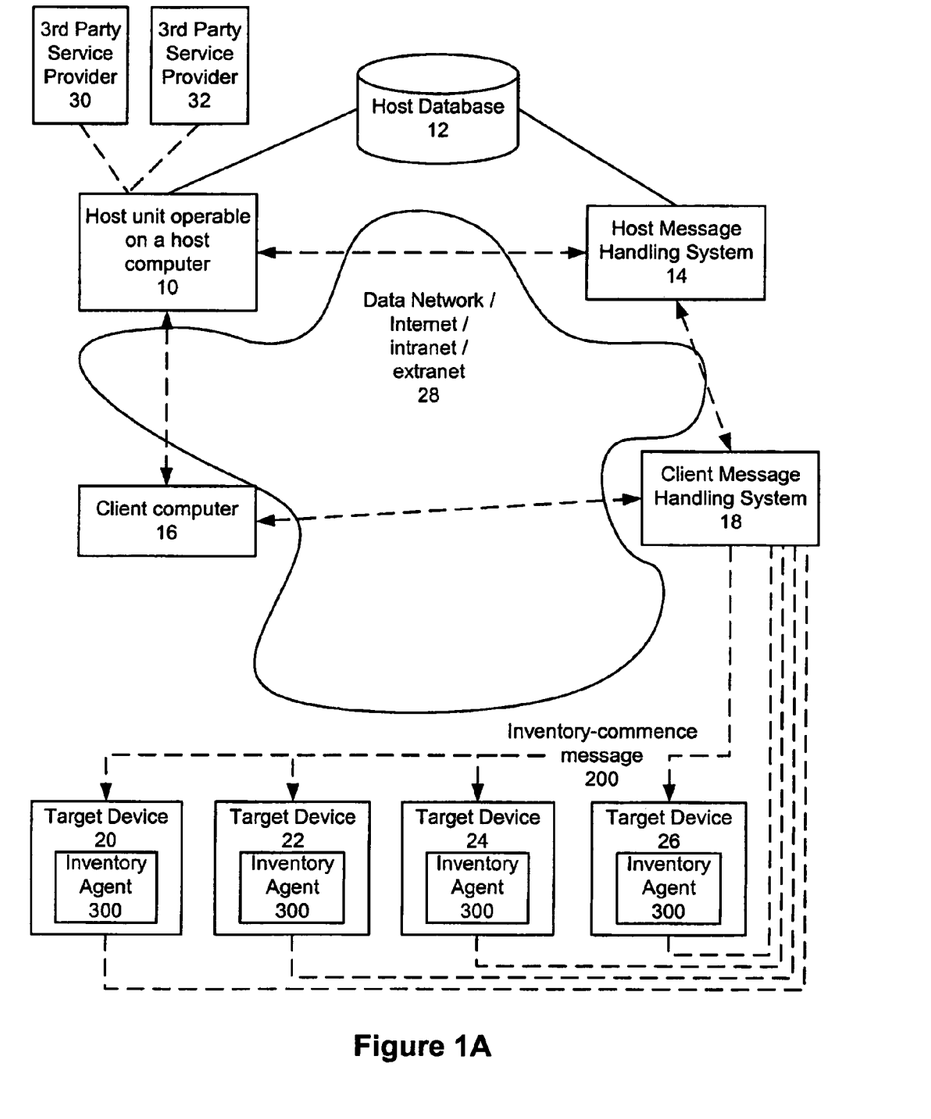
FIG. 1A is a block diagram showing a host, a client, and TDs accessible to a data network in accordance with an embodiment of the present invention.

Referring to FIG. 1A, there is illustrated a block diagram of an operating environment in accordance with an embodiment of the present invention comprising a Client computer 16 accessible via a data network such as the Internet, intranet or extranet 28 to a host unit for operation within a host computer 10, a client message handling system (MHS) 18, a host MHS 14, and TDs 20, 22, 24, and 26 which are associated with client MHS 18. For brevity, the host unit for operation within a host computer is described as host unit 10. A MHS may include electronic mail, voice mail, video mail, or other forms of communication. Host unit 10 is accessible to host database 12, and Client 16 is able to post queries against Host database 12 through Host unit 10. Host database 12, in accordance with an embodiment of the invention, is typically a relational database, however, other types of databases are contemplated in the invention, such as object oriented databases, hierarchical databases, multi-dimensional databases, and other databases able to accept commands from a query language. The dotted lines connecting Client 16, Client MHS 18, Host MHS 14, Host unit 10, and TDs 20 through 26 indicates that such TDs may only be intermittently accessible by Client 16. A TD may include a personal computer, telephone or cellular phone, personal digital assistant, computer aboard an aircraft or automobile, or other device associated with a particular organization and used to retrieve, store and/or transmit messages via the organization's MHS. Data network 28, as well as the association between Client MHS 18, and TDs 20 through 26 may include any combination of communications technology, for example, any one or a combination of a network, Internet, intranet or extranet connection, public telephone system, private telephone system, or cellular telephone system, and the like.

Also shown are third party service providers 30 and 32 which are accessible by Client 16 through Host unit 10. The third party service providers may review inventory data associated with the Client 16 and provide quotes for services related to relevant inventory. AssetPulse 200(™AssetMetrix, Inc.) 200 is shown in relation between client MHS and TDs 20 through 26.

Figure 1B:
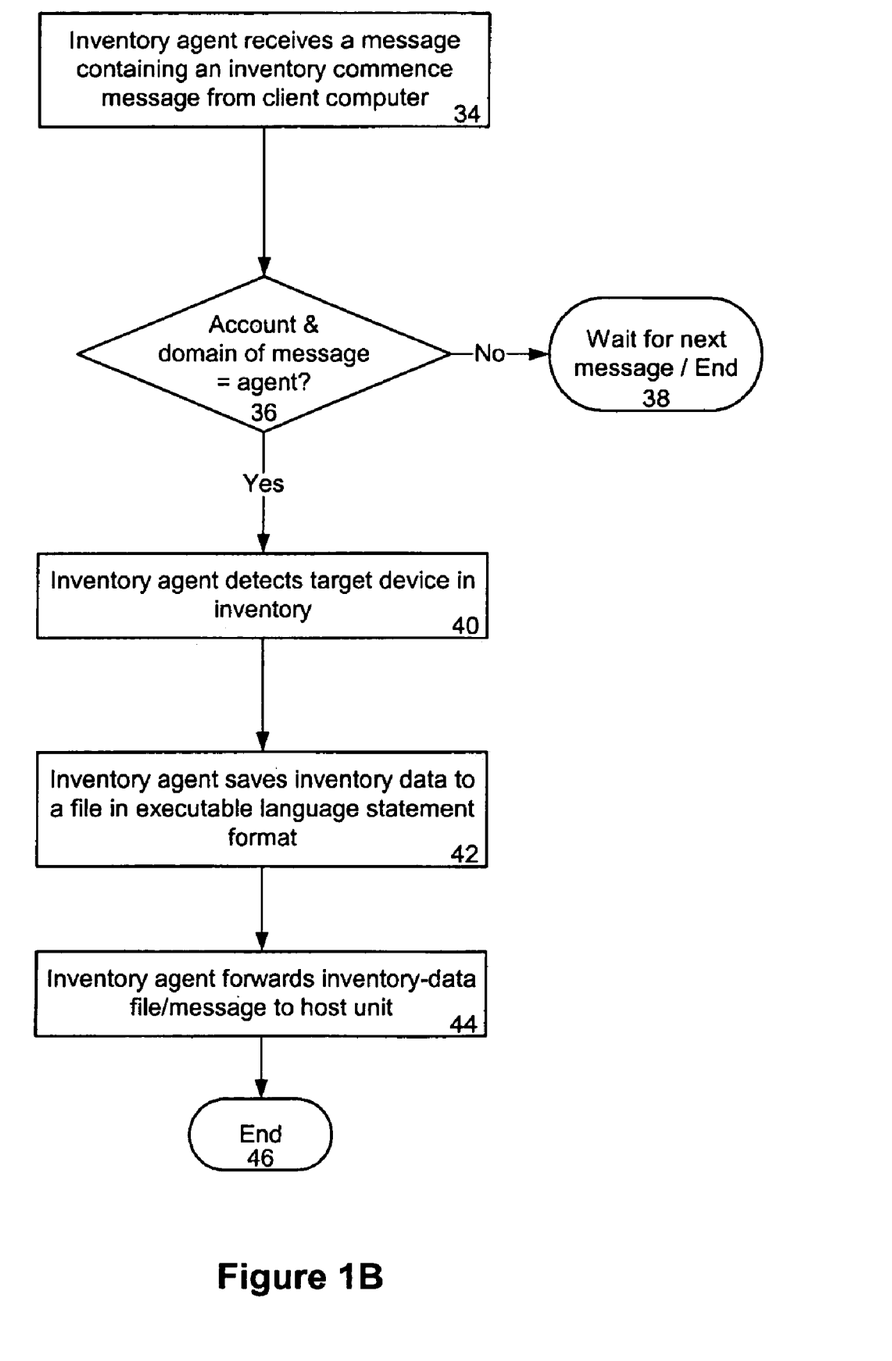
FIG. 1B is a flowchart illustrating a method for operating an inventory agent within a data network in accordance with an embodiment of the present invention.

Referring to FIG. 1B, there is illustrated a flow chart in accordance with an embodiment of the present invention comprising the operation of an inventory agent 300. With reference also to FIG. 1A, in a step (34), the inventory agent 300 receives an inventory-commence message, which term is used synonymously herein with AssetPulse 200, being a message attached to or embedded within a communication from a client computer 16. An AssetPulse 200 may be described as a message delivered by a client computer to a TD which instructs an inventory agent 300 loaded within the target device to commence an inventory. Furthermore, an AssetPulse 200 may itself contain an inventory agent 300 which may be loaded onto the TD. The AssetPulse 200 is forwarded through the client MHS 18 and is delivered to the inventory agents installed within the TDs 20 through 26. In a next step (36), the inventory agent 300 determines whether account and domain variables contained within the AssetPulse 200 equal that of the inventory agent 300. Account variables may be those identifiers created by the client. Domain variables may be identifiers unique to the data network address of the TD. If the variables do not match, the inventory action is terminated (38). If they do, the inventory agent 300 then detects computer software and hardware inventory associated with the TD (40). Such inventory may include an operating system, software, hardware, hard drive, motherboard, modem, monitor, or other software or hardware associated with the TD.

In a preferred embodiment, the inventory agent 300 then compiles the inventory data and saves it to a file in executable language statements such as Structured Query Language (SQL)(42). In a next step (44), the inventory agent 300 forwards the file in an inventory-data message to host unit 10 where it is then stored in a host database 12 and the action is ended (46). In a preferred embodiment of the invention, the actions described in FIG. 1B are not detectible by a user of the TD.

In a preferred embodiment, a TD need not be accessible or subscribing to the data network 28 at the time the AssetPulse 200 is transmitted by the client computer. The inventory agent 300 is capable of detecting the AssetPulse 200 at the next instance of connection or subscription to the data network 28 and will commence the inventory of the TD at that time.

Figure 1C:
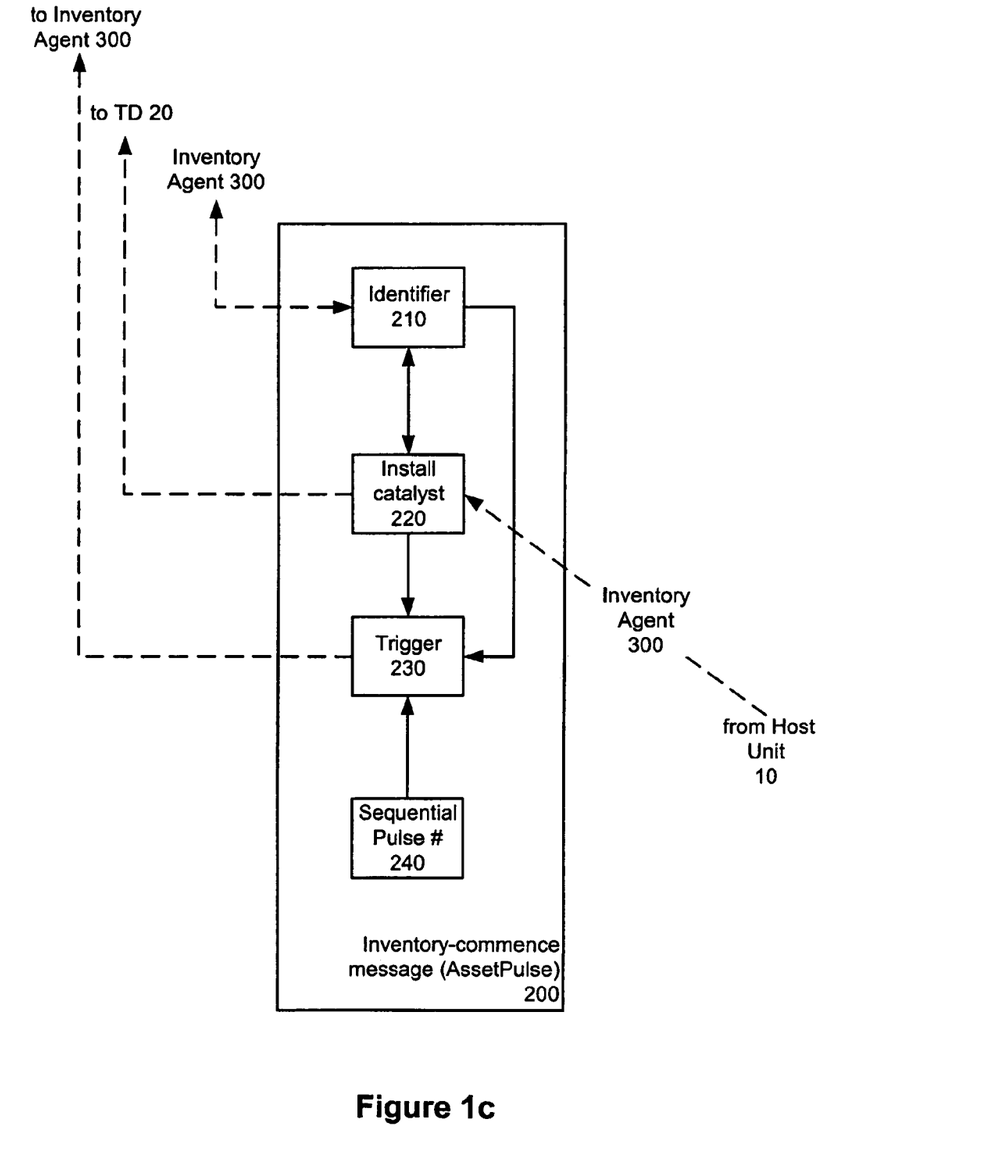
FIG. 1C is a block diagram showing an inventory-commence message, or AssetPulse (™AssetMetrix, Inc.), in accordance with an embodiment of the present invention.

Referring to FIG. 1C, and with reference also to FIG. 1A, there is illustrated a block diagram of an AssetPulse 200 in accordance with an embodiment of the present invention. An AssetPulse 200 may be executable code which serves as a catalyst to generate and return inventory data associated with a TD 20-26. The AssetPulse 200 comprises an identifier 210 for verifying the identity of an inventory agent 300 within a TD 20-26, an install catalyst 220 for initiating the download from the host unit 10 of an inventory agent 300 if the TD is not equipped with same, and a trigger 230 for causing the inventory agent 300 to commence an inventory of its associated TD. In a preferred embodiment, a sequential pulse number 240 associated with a discrete client request is included to assist with tracking the time and other particulars of inventory data associated with a particular request. If no inventory agent 300 is installed within the TD upon receipt of the AssetPulse 200. the install catalyst 220 commences a protocol which will install an inventory agent 300 via download from the host unit 10. Prior to download, the operating system of the TD may demand verification of the attempt to download an inventory agent 300 from the host unit 10. If no verification is required, then the inventory agent 300 is downloaded from the host unit 10. If the operating system demands verification that the attempted download is from an authentic source and not, for example, a virus, then a verification certificate will be displayed. In the case of multiple operating systems such as, for example, Windows 2000, Windows 98, Windows 95, WindowsNT (trademarks or registered trademarks of Microsoft Corporation), the TD user would be shown, for example, a "Certificate of Authenticity" from Verisign (trademark of Verisign, Inc.), or other third party verification agency.

Figure 1D:
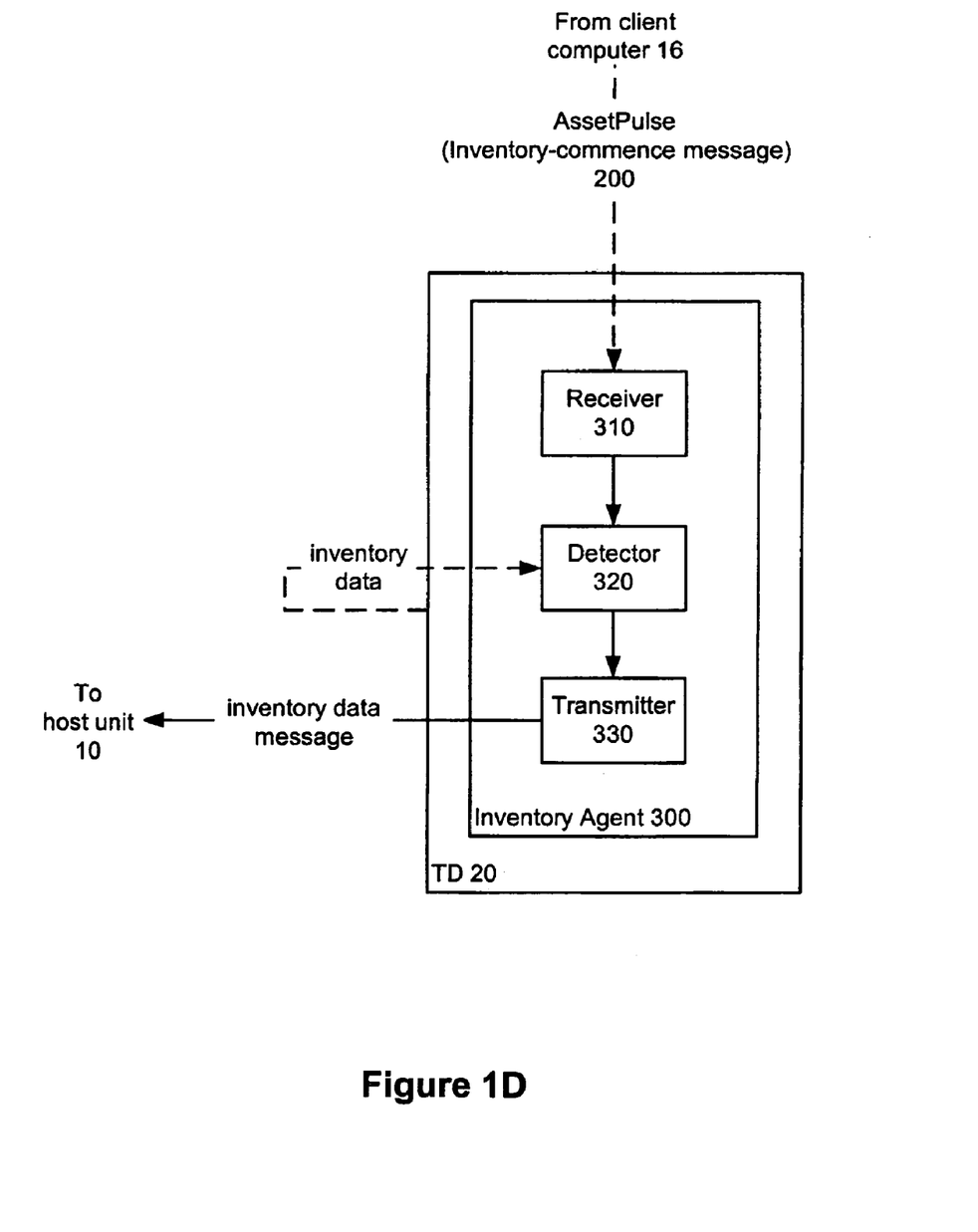
FIG. 1D is a block diagram showing an inventory agent in accordance with an embodiment of the present invention.

Referring to FIG. 1D, there is illustrated a block diagram of an inventory agent 300 in accordance with an embodiment of the present invention comprising a receiver 310 for receiving an AssetPulse 200 from a client computer 16, a compiler 320 for detecting and compiling inventory data associated with a TD 20-26, and a transmitter 330 for transmitting to a host unit 10 an inventory-data message including inventory data associated with the inventory agent 300 installed on its TD.

Figure 2:
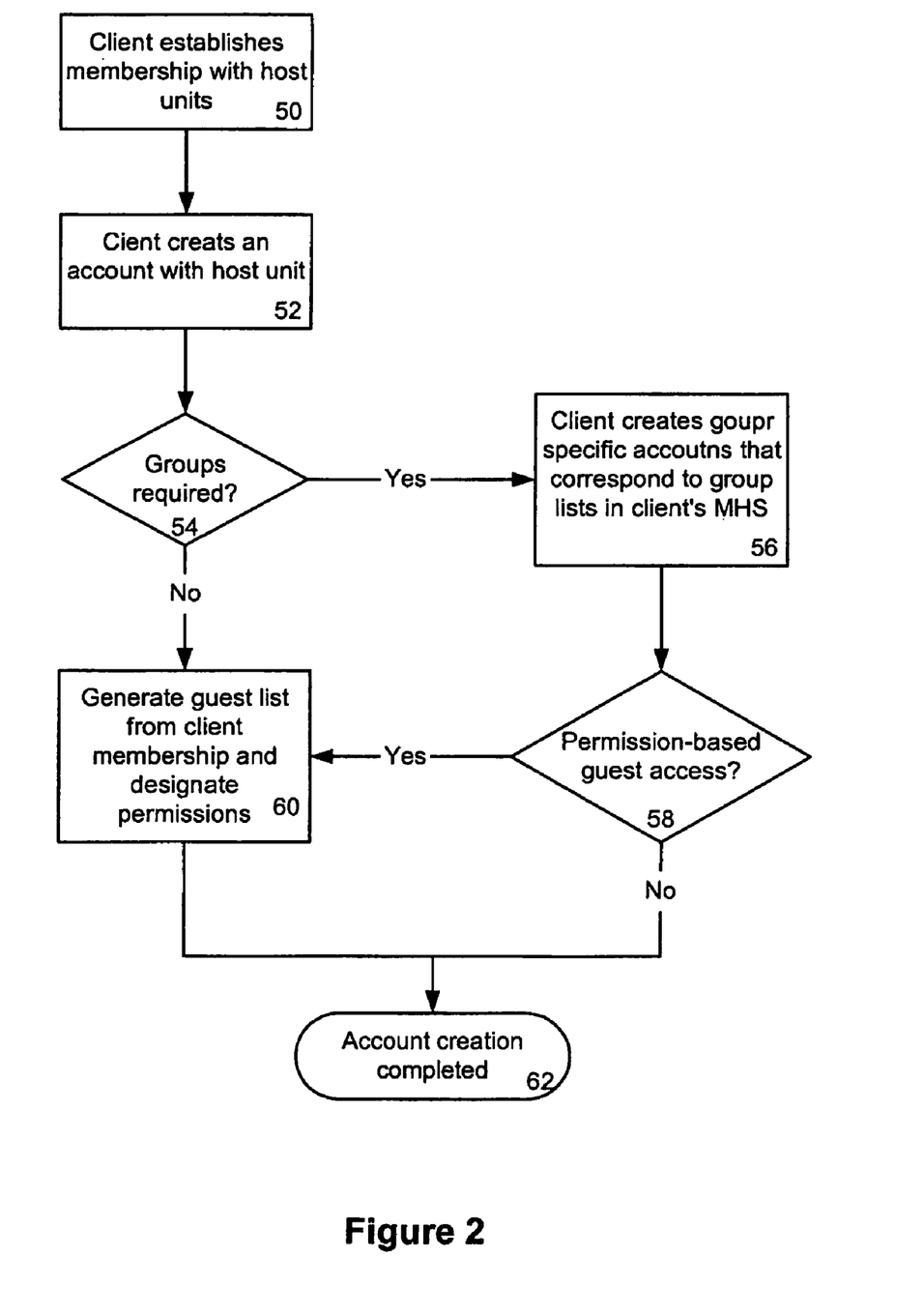
FIG. 2 is a flowchart illustrating a system and method for creating an account between a Client and a Host in accordance with an embodiment of the present invention.

Referring to FIG. 2, and with reference also to FIG. 1A, there is illustrated a flow chart in accordance with an embodiment of the present invention comprising a step (50) wherein a client computer 16 establishes via a data network 28 a membership on a host unit 10 accessible to a host MHS 14. A next step (52) follows wherein the client computer 16 establishes at least one account with the host unit 10, where an account may be an exclusive grouping of data relating to the software, hardware, and other assets associated with a particular TD 20-26 that subscribes to a client MHS 18.

A client, being an individual or organization operating a client computer 16, may decide to create a single account, or multiple accounts for the same specific organization, or for several organizations (54). In one embodiment, a client may create groups that correspond to various group lists in a particular client MHS 18, such as departments in a company (56).

In another embodiment, a client may not require the creation of groups within an account. A client may then invoke permission-based access to accounts which may restrict access to other viewers of inventory data (58). In this way, other viewers of inventory data may have restricted access to specific functions and specific accounts, including viewing reports, creating other guests to the account, invoking inventory requests, or other administrative functions.

If the client requires permission based guest access, a guest list may be generated from particular client memberships and various levels of permitted access may be assigned to specific guests (60). For example, certain guests may be given permission to view reports limited to aggregate information while others may be given permission to view complete information relating to inventory associated with a TD 20-26.

Once these actions have been taken, the account creation process is completed (62). It will be appreciated that groupings of TDs may be quickly established thus allowing the client to quickly access the inventory data for a specific group or groups, for example, the subsidiaries of a client or the departments within a client company.

Figure 3A:
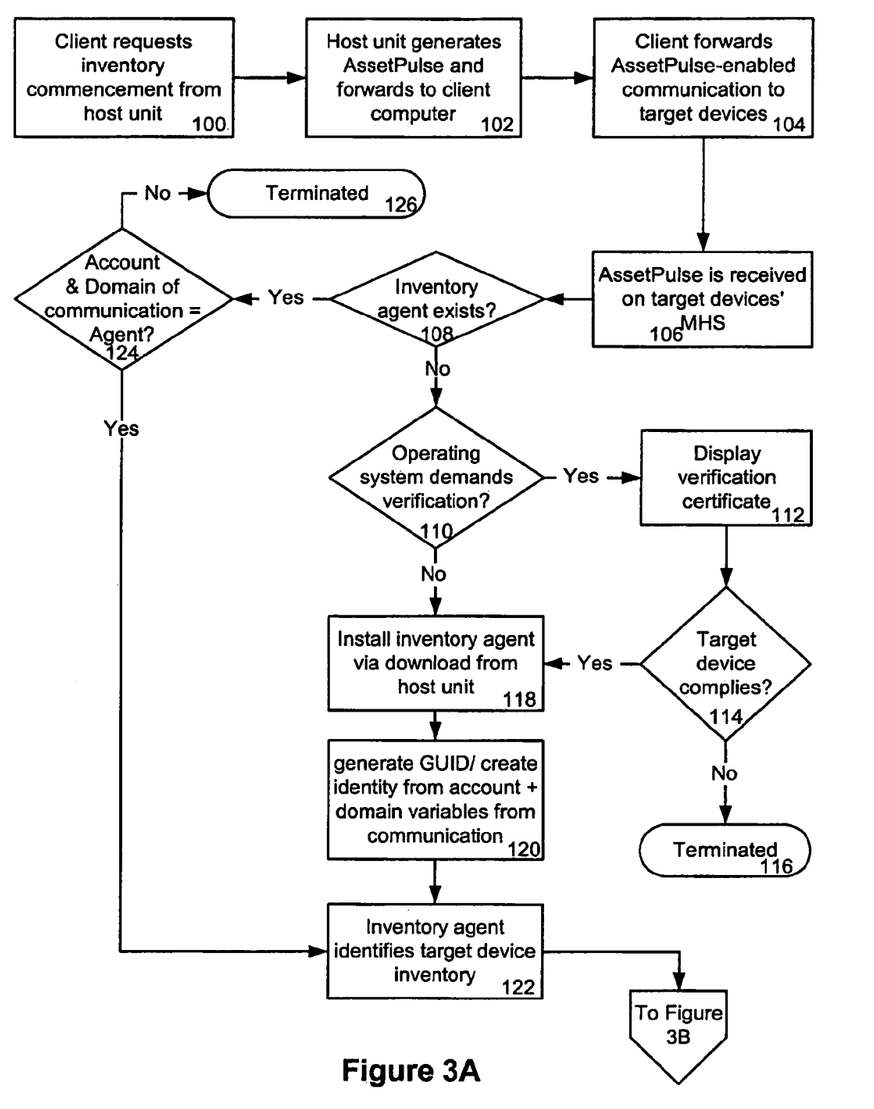
FIGS. 3A, 3B and 3C are a flowchart illustrating a system and method for remote component audit and inventory management in accordance with an embodiment of the present invention.
Figure 3B:
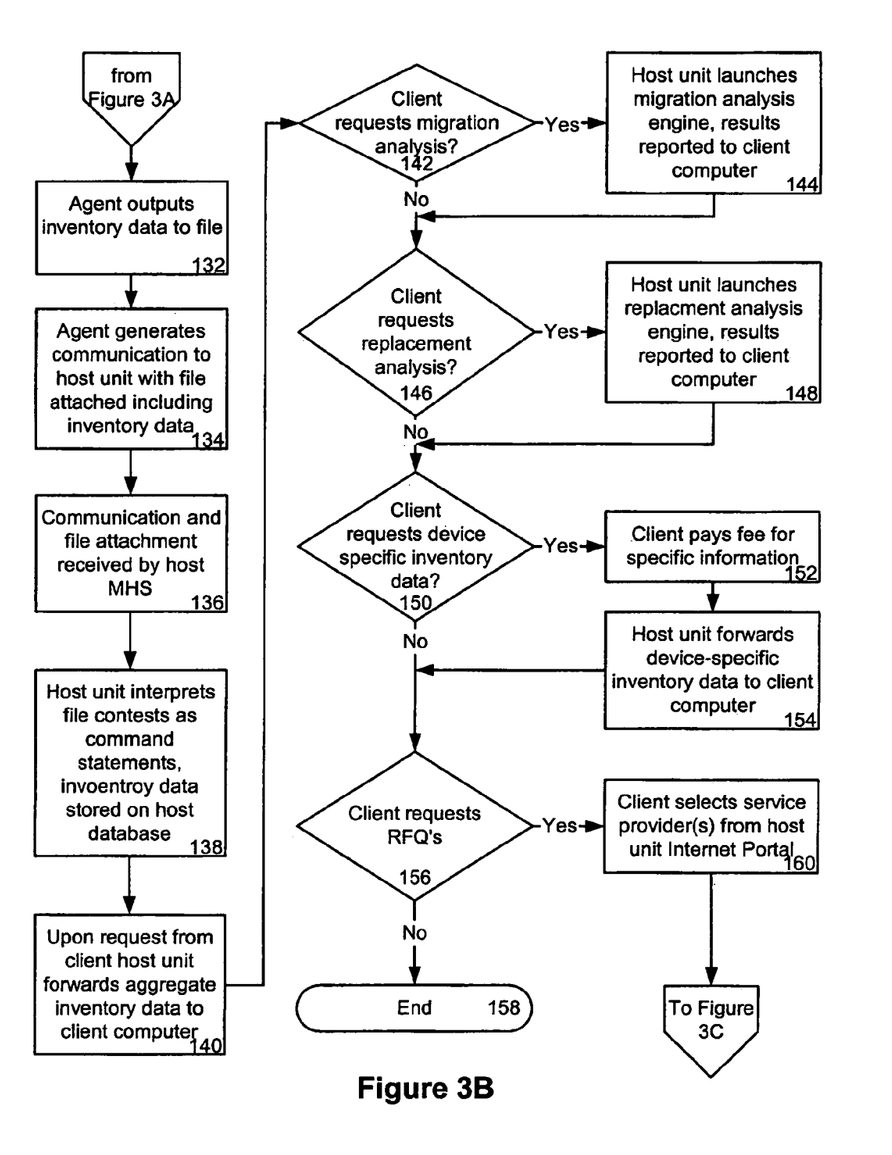
Figure 3C:
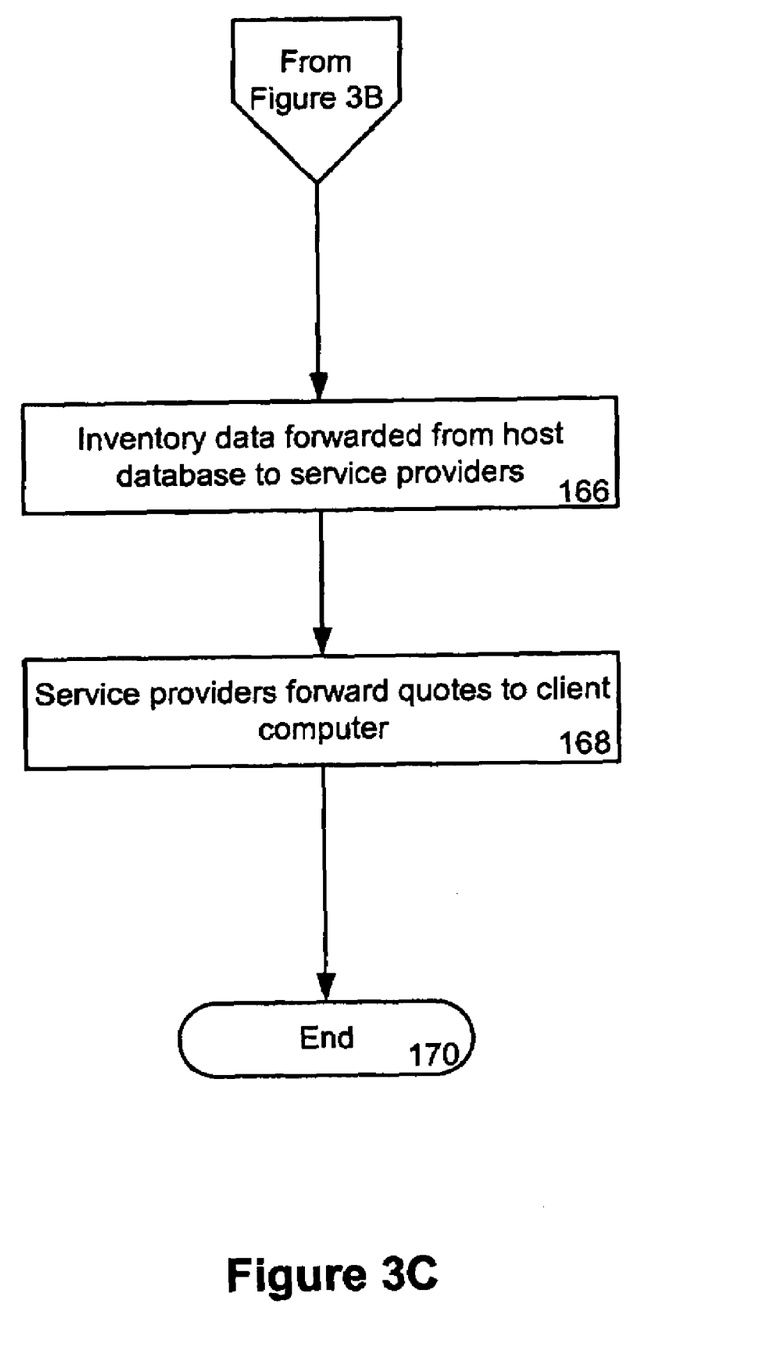

FIGS. 3A, 3B and 3C are a flowchart which illustrates a method of component audit and inventory management in accordance with an embodiment of the present invention. With reference also to FIG. 1A, in a step (100), the client computer 16 requests the commencement of an inventory action from the host unit 10. This step occurs once the account creation process, shown in FIG. 2, has been completed. The client's request may be by any means of electronic, or other communication, but typically such a request will be by way of an e-mail through the Client MHS 18.

Upon receipt by the host unit 10 of the client's inventory request, the host unit 10 generates an AssetPulse 200 which is typically forwarded to the client computer 16 by the host unit 10 in the form of an attachment to an e-mail, transmitted through an MHS (102). It will be recognized by those in the art that additional electronic communications may be employed such as voice-mail, video-mail or other electronic messages deliverable via a data network 28.

Upon receipt of the AssetPulse 200 enabled communication from the host unit 10 the client computer 16 forwards same to specified TDs 20-26 (104). The communication may be by way of e-mail, transmitted through a data network 28, Internet, intranet or extranet, however, other means of communication may be employed. In a preferred embodiment, the AssetPulse 200 is contained within the e-mail, and is transferred to the TD such that the AssetPulse 200 is not detectable by the user of the TD.

The inventory request, in the form of the AssetPulse 200 enabled e-mail, is received on the TD's MHS (106). In a preferred embodiment, the TD need only be intermittently accessible to the client MHS 18 such that the inventory request may be received by the TD seconds, minutes, or days after the inventory request was sent by the client computer 16.

The AssetPulse 200 then determines whether an inventory agent 300 is installed within the TD (108). If no inventory agent 300 is installed within the TD upon receipt of the AssetPulse 200, it then commences a protocol which will install an inventory agent 300 via download from the host unit 10. Prior to download, the operating system of the TD may demand verification (110) of the attempt to download an inventory agent 300 from the host unit 10. If no verification is required, then the inventory agent 300 is downloaded from the host unit 10 (118). If the operating system demands verification that the attempted download is from an authentic source and not, for example, a virus, then the AssetPulse 200 enabled e-mail will display a verification certificate (112).

The TD user will then either comply with the request to download (114), in which case the inventory agent 300 is then installed via a download from the Host unit. In the alternative the TD user will abort, and then the inventory request will be terminated (116).

As the inventory agent 300 is installed on a TD (118), it builds its identity by adopting the account and domain variables from the e-mail that launched its installation (120). In one embodiment, the inventory agent 300 will also further identify itself by generating a globally unique identity number (GUID). In a next step (122), the inventory agent 300 identifies the inventory associated with its TD and begins to generate inventory data.

The inventory agent 300 may already exist in the TD, in which case, the operating system verifications stage may be circumvented (108). If the inventory agent 300 exists at the time of the AssetPulse 200 enabled communication to the TD, the AssetPulse 200 will determine if the account and the domain of the communication equal that of the installed inventory agent (124). If they do not, the asset inventory is terminated (126). This is a security feature to ensure data exclusivity for each account. If they do, the inventory agent 300 then proceeds to identify TD inventory and build inventory data (122).

It will be apparent to those skilled in the art that the inventory agent 300 may be installed by IT personnel upon the purchase of a TD and before its deployment to TD users. Installation may be via Client MHS 18 download, or via download from computer-readable media such as floppy disks or CDs. In a preferred embodiment where TDs are operating on a Windows operating system, the inventory agent 300 is installed on the non-volatile portion of the hard drive of the TD, for example, in the downloaded program file section, where it will remain protected by virtue of the configuration of the Windows operating system. In other embodiments, other installation locations may be employed.

Once the inventory agent 300 is installed, either automatically or by TD user confirmation, no further installation request or other interaction with the host unit 10 or other aspect of the inventory request, compilation and report may be required by the TD user. In a preferred embodiment, the inventory commence message, compilation, and transmission of inventory data to the host unit 10 are transparent to the TD user. This transparency is accomplished in a preferred embodiment by transmitting the inventory commence message within an email addressed to the user of a TD, and not as an attachment to same. The AssetPulse 200 includes code that acts as a trigger that activates the inventory agent 300 installed in the downloaded program file section of the operating system of the TD. The TD user is not involved in this process and there are no indications to the TD user that the processes noted above are taking place. The TD user is only notified once and only if an inventory agent 300 has not yet been installed in the TD at which time the AssetPulse 200 will act as a catalyst to install same from host unit 10.

It is possible to circumvent any user involvement when installing the inventory agent 300 for the first time. If the inventory agent 300 is installed from a location the TD would consider secure, then the TD would not consider its download and activation to be a threat or virus and, as such, would not require TD user notification and approval prior to installation of the inventory agent 300.

In a further step (132), the inventory agent 300 outputs inventory data to a file. Such inventory data may include the following attributes of the TD: operating system, software, hardware (both of the TD and of any connected peripherals), and any other TD inventory as the case may be. In one embodiment, the inventory agent 300 outputs the inventory to a data file as SQL statements. In other embodiments, other predefined query languages may be employed. In a next step the inventory agent 300 generates an outgoing communication, also called an inventory-data message, to the Host with an attached inventory data file (134). Such message may be forwarded to an account on the host MHS 14 either immediately or upon reconnection or access by the TD to the data network 28. In a preferred embodiment, the inventory-data message is not detectable by the TD user.

In a next step (136), the communication and file attachment containing the inventory data are received by the host unit 10 through host MHS 14. Once the communication, which may be an e-mail, is received the host unit 10 interprets the file contents as command statements, and the inventory data is stored (138) on the host database 12. In one embodiment, the attached data files open and the contents are shown as SQL statements and are outputted directly to an SQL compliant database where the commands are immediately interpreted as commands to include (or modify or add) the results of the inventory compilation into the structure of the host database 12.

In a next step (140), the host unit 10 forwards the aggregate inventory data to the client computer 16, upon the client's request. At any time before or after an account inventory data action has been invoked, the client may access its account on the host unit 10. The client may view the inventory data which may be shown as aggregate numerical and/or graphical representations of the results of the account inventory action. Aggregate results may include total number of TDs, operating system distribution, software distribution, hardware distribution.

The Client may then have a plurality of options regarding information that may be provided by the Host, or facilitated by the Host. In a next step (142), the Client may request a migration analysis. If such migration analysis is requested, the Host will launch a migration analysis engine operating on the inventory data associated with the Client's TDs (144). For example, upon receipt of the inventory data from the TDs, the host unit 10 can determine specific attributes of TDs and then calculate and compare the company internal cost and time associated with invoking services associated with the TD such as procurement, deployment, removal and storage, or disposal. Furthermore, the host unit 10 can compare these costs with the costs and time associated with contracting services to external service providers (ESPs). An algorithm is employed by the host unit 10 to facilitate these calculation which are based on the inventory data information.

In another embodiment, where the cost of services depends upon understanding configurations such as age and components of the TDs scheduled to be serviced, the client computer 16 can anonymously and electronically send data elements relating to the TD configuration to external service providers (ESPs) to facilitate the analysis of TD configurations and publish a bid against a request for quote associated with the Client's TDs. For example, a request for quote might be associated with the resale estimates or disposal services related to certain TDs.

In another step (146), the Client may request a replacement analysis from the host unit (10). If so, the host unit (10) launches a replacement engine and reports the results to the Client (148). In one embodiment, the host unit 10 can determine the processor speed and the central processing unit configuration of the central processing unit obtained from the compiled inventory data retrieved from the TD to determine the probable purchase date of that TD. Through computer software programmed to execute an algorithm, the host unit 10 is able to postulate the probable and preferred disposal dates of that TD based on common accounting base depreciation methods. By applying these calculations to all of the TDs in the Client's accounts, the host unit 10 is able to determine certain statistics associated with the future replacement and disposal requirements of the TD.

Furthermore, by applying a computer program to execute an algorithm for comparing a company's TD population to that of other companies, the host unit 10 can postulate the client's growth rate and apply that growth rate to replacement and disposal calculations.

In another step, the Client may request device specific inventory data (150). In this case, the client will pay a fee for such specific information (152). Upon receipt of the fee, the host unit 10 forwards device specific inventory data to the Client (154).

In another step (156), the Client may request a Request for Quote from ESPs, where such ESPs are accessible by the Client from a host unit portal (160). In this case, inventory data may be forwarded from the host database 12 to ESPs at the client's instruction (166), and ESPs will forward Request for quotes to client computer 16 (168). The inventory process may then be ended (170) upon completion of the steps noted above. The host unit 10 further facilitates this process by allowing a client to invoke a request for quote to multiple ESPs simultaneously by storing the associated cost variables, such as resale values, processing costs, labour rates, for participating ESPs within the host database 12.

The many features and advantages of the invention are apparent from the detailed specification, and thus, it is intended by the appended claim to cover such features and advantages of the invention which fall within the true scope of the invention. Further, since numerous modifications and variations will readily occur to those skilled in the art, it is not desired to limit the invention to the exact construction and operation illustrated and described, and accordingly, all suitable modifications and equivalents may be resorted to falling within the scope of the invention.

What is claimed is:

1. A component audit and inventory management system comprising:
   a receiver, on a target device, including means for receiving an inventory-commence message from a client computer over a data network in response to a request from the client computer to a host unit for accessing hardware and software inventory data on the target device, said inventory-commence message being generated by the host unit and being sent to the client computer, said target device being remote with respect to and not connected to the client computer, said target device being only intermittently accessible on its own to the data network, wherein the target device, the client computer, and the host unit are separate devices from one another and are remote with respect to one another;
   a detector, on the target device, including means for collecting the hardware and software inventory data relating to hardware and software installed on the target device in response to commands included in the inventory-commence message;
   a transmitter, on the target device, including means for transmitting from the target device to the host unit of the component audit and inventory management system, through the data network, an inventory data message including the inventory data associated with the target device, wherein the client computer initiates access to the host unit for accessing the hardware and software inventory data of the target device; and
   an inventory agent comprising executable code for communicating with the receiver, detector, and transmitter.

2. An inventory agent as claimed in claim 1, wherein the receiver includes means for comparing the identity of an inventory-commence message with an identity of the inventory agent.

3. An inventory agent as claimed in claim 2, wherein the inventory agent includes means for terminating the inventory data collection if the identity of the inventory-commence message is not associated with the identity of the inventory agent.

4. An inventory agent as claimed in claim 1, wherein the inventory-commence message is an electronic mail message retrievable by the target device when it connects to the data network.

5. An inventory agent as claimed in claim 1, wherein the inventory-commence message receipt, inventory data collection, and inventory data message transmission are transparent to a user of the target device.

6. An inventory agent as claimed in claim 1, wherein the collected inventory data is saved directly to a file in executable language statements for incorporation into a database.

7. An inventory agent as claimed in claim 6, wherein the executable language statements include Structured Query Language (SQL) statements.

* * * * *